July 4, 1944.    C. L. JOHNSON    2,352,955
ANGLE OF ATTACK INDICATOR
Filed Sept. 13, 1940    4 Sheets-Sheet 1

INVENTOR
CLARENCE L. JOHNSON
BY
his ATTORNEY

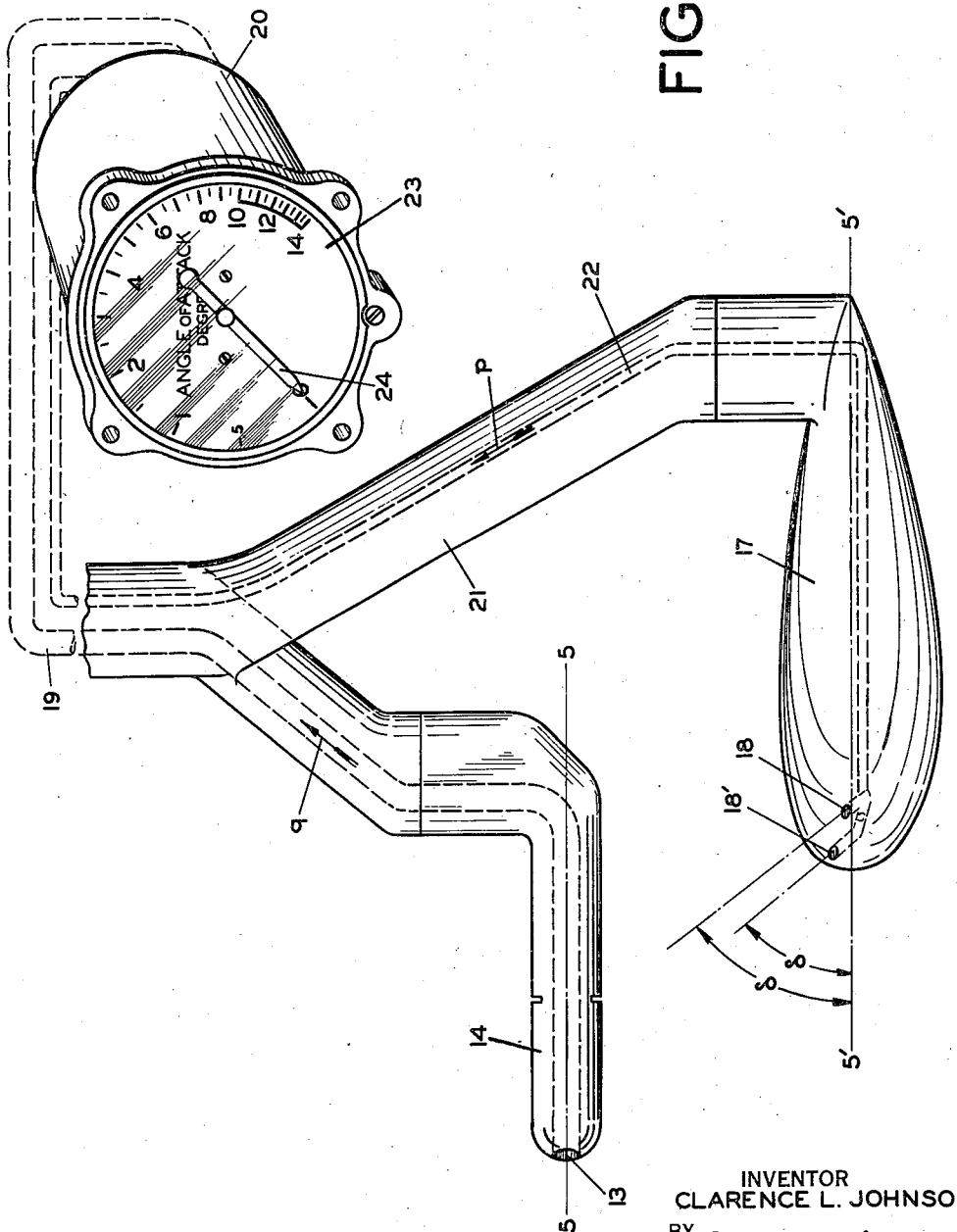

July 4, 1944.  C. L. JOHNSON  2,352,955
ANGLE OF ATTACK INDICATOR
Filed Sept. 13, 1940    4 Sheets-Sheet 3

INVENTOR
CLARENCE L. JOHNSON
BY
his ATTORNEY

July 4, 1944.　　　C. L. JOHNSON　　　2,352,955
ANGLE OF ATTACK INDICATOR
Filed Sept. 13, 1940　　　4 Sheets-Sheet 4

INVENTOR
CLARENCE L. JOHNSON
BY
his ATTORNEY

Patented July 4, 1944

2,352,955

UNITED STATES PATENT OFFICE 2,352,955

ANGLE OF ATTACK INDICATOR

Clarence L. Johnson, Burbank, Calif.

Application September 13, 1940, Serial No. 356,620

14 Claims. (Cl. 73—180)

This invention relates to improvements in indicating or warning devices for aircraft.

More particularly, it is an object of this invention to provide a device for indicating conditions of flight under which an airplane will stall.

It has been observed that conditions under which an airfoil will fail to react on, or to be supported by, surrounding air do not occur at a particular rate of flow of the surrounding air relatively to the airfoil, but may occur within a considerable range of speed of the airstream.

Certain types of aircraft, for example, will stall at an air-speed of 60 M. P. H. at one time and at 110 M. P. H. at another time.

For this reason an observation of an air-speed indicator will not give reliable indication of an approach to a flight condition under which the plane will stall.

It is, accordingly, an object of this invention to provide an apparatus for accurately ascertaining an approach to, or the existence of, a flight condition under which a plane will stall irrespective of the existing air-speed.

The invention is based on the observation that an airfoil will fail to be supported by the surrounding air when the airstream strikes the airfoil at more than a predetermined angle with respect to its axis. For the purpose of this description, the axis of an airfoil is understood as being the longitudinal axis extending from the leading to the trailing edge in a vertical cross-sectional plane of the airfoil. The angle of the airstream with respect to the axis of the airfoil will hereinafter be referred to as "angle of attack."

More generally it is an object of this invention to provide an apparatus for determining direction of flow of a pressure fluid, such as air, with respect to an airfoil and also a device for practicing this method. This device is particularly useful in aeronautics for determining the most suitable angle of attack during flight, more particularly during climbing and landing.

It is, therefore, an object of this invention to provide an apparatus for determining the angle of attack or an approach to conditions under which an airplane will stall.

Broadly the mode of operation of my apparatus consists of the steps of deriving a first impulse proportional to the square of the rate of flow of the surrounding air relatively to the airfoil; deriving a second impulse proportional to the dynamic impact pressure exerted at a substantial angle relatively to the axis of the airfoil, or to the path of normal travel of the airfoil to the surrounding air; determining the ratio of said two impulses, said ratio affording a measure of the angle of attack. For the purpose of this description an impulse is understood to be a measurable physical value such as a force, an electric potential, a pressure or the like.

More specifically this invention aims at providing a simple apparatus for determining the angle of attack or conditions of stalling by utilizing two pressure impulses derivable from the surrounding air in two directions or axes including a substantial vertical angle between themselves.

Another object of the invention is to provide an angle of attack indicator in which the parts exposed to the surrounding air are immovable.

The invention further aims at providing an indicating device in which the parts exposed to the surrounding air offer a minimum of resistance to the air and are easy to keep free from ice even under unfavorable weather conditions.

More particularly, the invention aims at providing an angle of attack or stall indicator including a pressure head for deriving dynamic impact pressures from the surrounding air which may be maintained free from ice by electric heating means in the same manner as electrically heated Pitot static tubes.

The invention further aims at providing a pressure head for deriving two impact pressures from the surrounding air, the pressures being taken in two directions including a substantial angle between themselves. In this specification the term "impact pressure" is broadly used as defining a pressure set up at a pressure port by flowing air directed at or past the same. This pressure may be positive if the flow of air is directed into the pressure port or may be negative if the direction of the air is such as to create a suction in the port.

It is a further object of this invention to provide a pressure head for deriving a static and two dynamic pressures from the surrounding air, one of which is proportional to the square of the air-speed.

Further aims, objects and advantages of this invention will appear from a consideration of the description which follows with accompanying drawings showing for purely illustrative purposes embodiments of this invention. It is to be understood, however, that the description is not to be taken in a limiting sense, the scope of this invention being defined in the appended claims.

In the drawings:

Fig. 2 is a perspective view of a device for determining the angle of attack;

Figure 1:
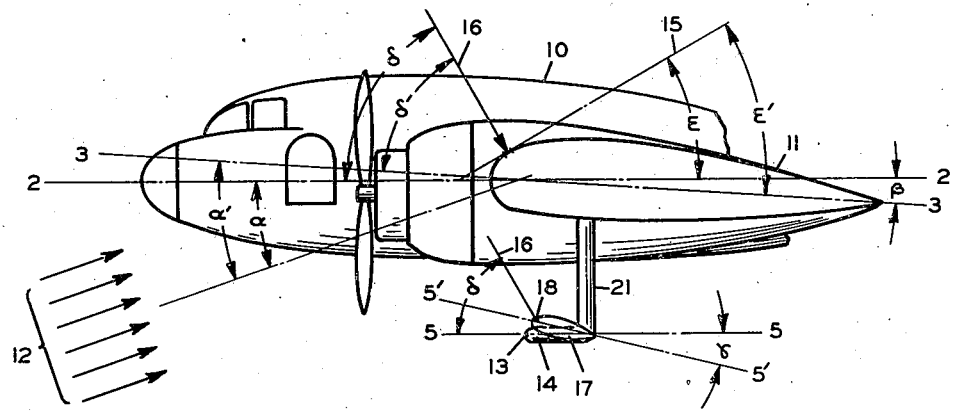
Fig. 1 is a view of an airplane illustrating the principle of the invention.

The principle of the invention is illustrated in Fig. 1 showing an airplane having a fuselage 10. The longitudinal substantially horizontal axis of the fuselage, commonly called "thrust line," is designated 2—2. The wing 11 of the airplane has a longitudinal axis 3—3 extending from the leading edge or curved front to the trailing edge. This axis is substantially horizontal but may include a certain angle β with respect to the thrust line 2—2 of the fuselage.

When the plane is in flight the surrounding air, indicated by arrows 12, will strike the fuselage and the wing at a certain angle. This angle of attack may either be measured as angle α with respect to the thrust line 2—2 or, more generally, as angle α' with respect to an axis of an airfoil such as the axis 3—3 of the wing 11.

It will be noted that in the illustrated example the angles α and α' differ in magnitude by the amount β, the angle between the thrust line and the axis of the wing 11. For the sake of clearness all angles in Fig. 1 are exaggerated.

While it was previously assumed that the rate of flight or air-speed of an airplane affords a measure of the condition under which the plane will stall, it was found that the same type of plane may stall at a higher speed at one time and at a lower speed at another time depending on various factors such as load, for example. It was found, however, that the same type of plane will stall when the angle of attack α or α' exceeds a predetermined magnitude which is characteristic and critical for the type of plane.

More generally it may be said that an airfoil will stall, that is, will fail to be supported by, or react on, the surrounding air if the angle of attack exceeds a predetermined magnitude. This may easily be visualized if it is remembered that, for example, a wing of an airplane is supported primarily by suction at its upper surface rather than pressure at its lower surface and that the suction at its upper surface is created by air striking the leading edge of the airfoil at a certain angle. If this angle exceeds a critical value, the smooth flow of air at the upper surface creating the supporting suction pressure will be disturbed and the support on the wing be lost.

According to this invention the angle of attack may be determined by deriving two impulses from the air surrounding the plane. A first impulse is taken which is proportional to the square of the rate of flight or air-speed. This impulse may be taken from an air-speed indicator or most conveniently derived as the dynamic pressure taken at the dynamic pressure port 13 of a Pitot static tube 14, this pressure being taken in a substantially horizontal direction substantially parallel with the thrust line of the plane. In Fig. 1, the axis of the dynamic pressure port 13 is designated 5—5.

A second impulse is derived which is proportional to the dynamic or impact pressure exerted normal to an elementary area 15 of the airfoil, the area being inclined by a substantial angle with respect to the axis of the airfoil.

In Fig. 1 the elementary area 15 is shown inclined with respect to the thrust line 2—2 and the axis 3—3 of the airfoil 11 by angles ε and ε' respectively. The direction or axis at which the pressure is taken is normal to the area and indicated by an arrow 16. This axis 16 forms angles δ and δ' with the thrust line or the axis 3—3 of the airfoil 11 respectively. This pressure impulse must not necessarily be taken at the wing 11 of the plane but may be taken at an auxiliary airfoil 17 having a dynamic pressure port 18, the axis of which includes a substantial vertical angle with respect to the horizontal or the axis of the airfoil proper. In the illustrated embodiment the axis is denoted 16'.

Best results are obtained if the angles ε and ε' are of the order of less than 65°. The axis along which the pressure is taken, the direction 16 normal to the elementary area forms, accordingly, angles δ and δ' of the order of more than 25°. I have found that optimum results are obtained if the inclination of the elementary area and, accordingly, the direction of the axis 16 at which the pressure is taken, forms a vertical angle of about 45° with respect to the axis of the airfoil.

Of the two impulses thus obtained a ratio is formed, the ratio being a measure of the angle of attack. Utilizing dynamic pressures, for example, as hereinbefore set forth, the ratio $p/q$ is proportional to the angle of attack wherein $q$ is the impact pressure taken at the dynamic port 13 of the Pitot static tube and $p$ is the impact pressure exerted in the direction of the axis 16 on the elementary area 15 or derived at the port 18 of the auxiliary airfoil 17.

In Fig. 2 a device is shown for conveniently deriving two pressure impulses, the ratio of which will afford a measure of the angle of attack. The device is similar to the one shown in Fig. 1 on a reduced scale, the only difference being that in the device of Fig. 2, the axis of the airfoil 5'—5' is shown parallel to the axis 5—5 of the Pitot static tube. As will be explained hereinafter in greater detail, it is sometimes advantageous to tilt the axis of the auxiliary airfoil by an angle of pitch γ with respect to the axis 5—5 or the thrust line 2—2 in order to obtain a greatest possible change in the ratio $p/q$ for small changes in the angle of attack.

A first dynamic pressure duct 19 connects the dynamic pressure port 13 of the Pitot static tube 14 with the mechanism of an indicating instrument 20. The pressure set up by the air impinging upon the port 13 is $q$ and proportional to the square of the rate of air-speed. A support 21 in the form of an inverted Y to which the Pitot tube 14 is mounted supports the pressure head 17 having two pressure ports 18 and 18' forming an angle δ with the axis 5—5. The pressure ports 18 and 18' communicate with a pressure duct 22 in which an impact pressure $p$ is set up actuating the indicator 20 jointly with the pressure $q$ taken at the Pitot static tube. I have found that it is advantageous to make the ports 18 and 18' smaller than the dynamic pressure port 13 of the Pitot static tube. Particularly good results are obtained if the size of the pressure ports 18 and 18' is less than one-sixteenth, preferably one-thirty-second, of an inch. The indicator 20 is shown as having a dial 23 graduated in angle of attack.

A pointer 24 is movable relatively to the dial by means of a pressure responsive actuating mechanism later to be described. Since the angle of attack is proportional to the ratio $p/q$ the dial may also be graduated to indicate ratio instead of angle.

Figure 3:
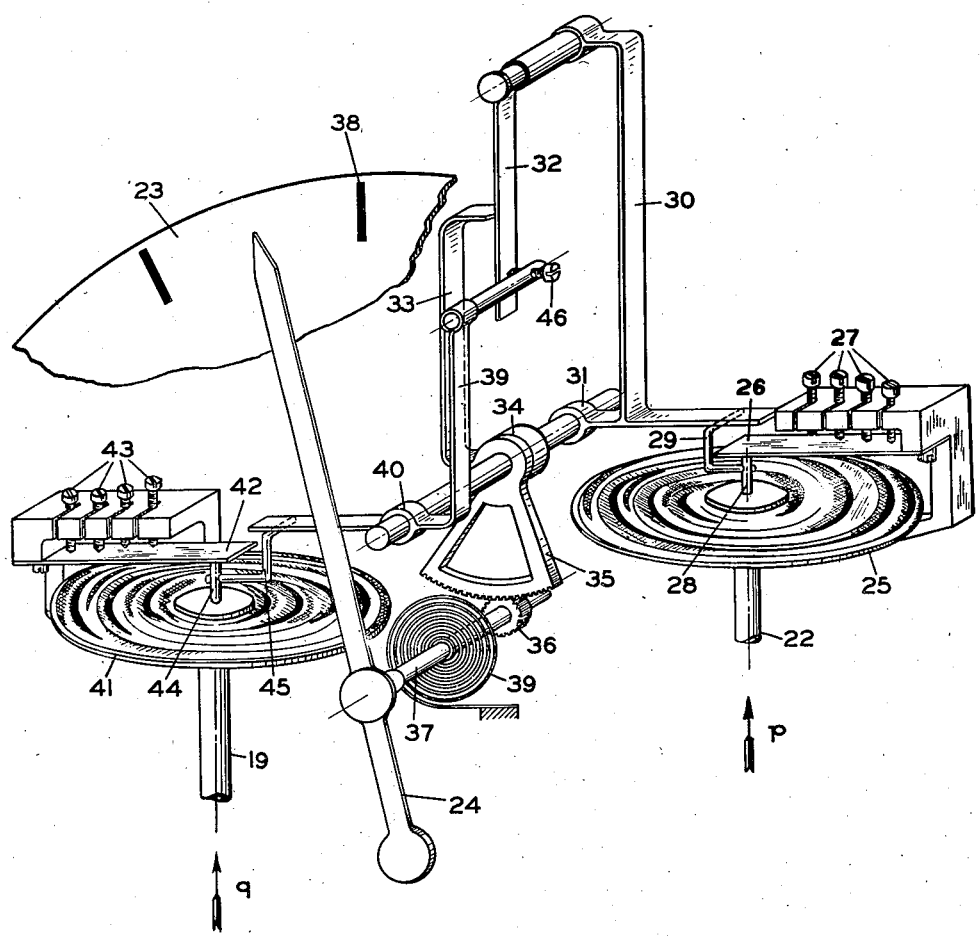
Fig. 3 is a diagrammatic view of the indicating instrument shown in Fig. 2.

In Fig. 3 there is shown a form which the mechanism of the indicating instrument may assume.

Briefly the device operates by creating a first movement which is proportional to the logarithm of the first impulse, pressure $p$, and by subtracting from that first movement a second movement which is proportional to the logarithm of the second impulse, the pressure $q$.

The difference between the two movements is then indicated on a logarithmically graduated dial.

In the illustrated embodiment a first diaphragm 25 connected to the pressure duct 22 is acted upon by the pressure $p$. The diaphragm is restrained to expand and contract proportional to the logarithm of the pressure $p$ acting upon the same. This may be accomplished by means of a leaf spring 26 having adjustable stops 27 and acting upon the centerpiece 28 of the diaphragm.

The center piece carries a bracket 29 actuating a bell crank lever 30 pivoted at 31. The bell crank 30 carries at its free end a pivotally mounted strip 32. This strip is engaged by and actuates a differential lever 33 pivoted at 34 and connected to a toothed segment 35 engaging a pinion 36 of a pointer shaft 37. The pointer shaft carries a pointer 24 movable over the dial 23 carrying a logarithmic graduation 38.

The movable strip 32 is further engaged by a second bell crank lever 39 pivoted at 40 and acted upon by a second diaphragm 41 connected to the pressure duct 19. The second diaphragm is restrained for logarithmic response by means of a leaf spring 42 having adjustable stops 43 and resting against the center piece 44. The center piece has a bracket 45 engaging the other end of the bell crank lever 39.

Preferably one arm of the bell crank lever 39 is made adjustable. This is accomplished in the illustrated embodiment by an adjusting screw 46 engaging the movable strip 32.

The operation of the device is as follows:

Assuming first that the pressure $q$ remains constant while the pressure $p$ increases, the bell crank lever 30 is moved in counterclockwise direction about its axis thereby moving the differential lever 33 to the left. During this movement the end 46 of the second bell crank lever 39 remains stationary thus acting as a pivoting support for the strip 32, assuming pressure $q$ to remain constant. The differential lever 33 moves the toothed segment 35 and imparts a clockwise motion to the pointer 23.

In actual operation, however, a change in the pressure $p$ is usually accompanied by a change in the pressure $q$. An expansion of the diaphragm 41 causes the end 46 of lever 39 to move to the right thereby reducing the displacement of the differential lever 33 by an amount proportional to the logarithm of the pressure $q$, thereby forming the difference between two logarithms or, in other words, the ratio $p/q$ indicated on the logarithmic dial 23.

The illustrated device is designed for use in connection with the pressure head in which the pressures are positive. If, however, a pressure head is used which is so shaped or in which the pressure ports are so located that within the range in which the instrument is used the $p$ pressures are in the negative, or suction range, it may be necessary to mount the $p$ diaphragm 25 to act upon the bell crank lever 30 in the opposite direction.

The dial may conveniently be graduated in angle of attack units rather than ratio units. The spring 39 serves to maintain the lever mechanism in engagement.

Figure 4:
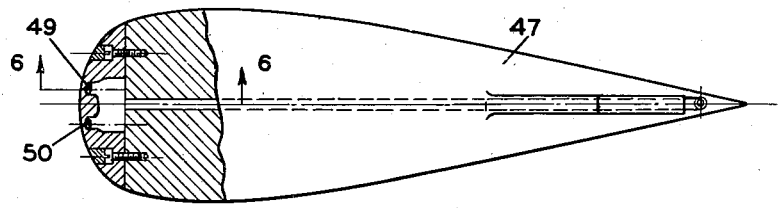
Fig. 4 is a plan view partly in section of a pressure head for determining the angle of attack; a section being taken on line 4—4 in Fig. 6.
Figures 5, 6:
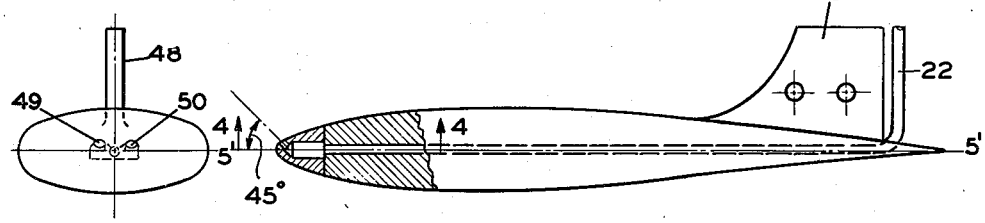
Fig. 5 is a front view of the device shown in Fig. 4.
Fig. 6 is a side elevation partly in section of the device shown in Fig. 4, a section being taken on line 6—6 of Fig. 4.

In Figs. 4 to 6 a preferred form of pressure head is shown for use in an angle of attack indicator. The device comprises a body or shell 47 provided with a mounting fin 48 near its trailing edge for mounting to a strut or other form of support. Two pressure ports 49 and 50 are provided at the curved front forming a vertical angle of preferably 45° with the longitudinal axis 5'—5' of the airfoil. The pressure ports communicate with the pressure duct 22 connectible to an indicating instrument.

The use of two pressure ports is advantageous because it makes the device non-responsive to slight amount of yaw, that is inaccuracies in the direction in which it is headed.

Figure 7:
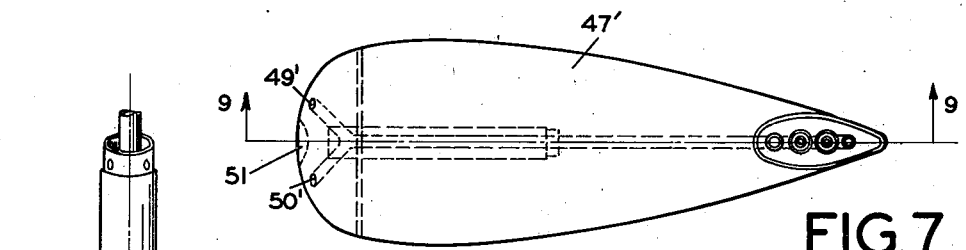
Fig. 7 is a plane view of a modified form of pressure head for determining the angle of attack.
Figure 8:
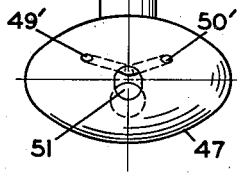
Fig. 8 is a front view of the device shown in Fig. 7.
Figure 9:
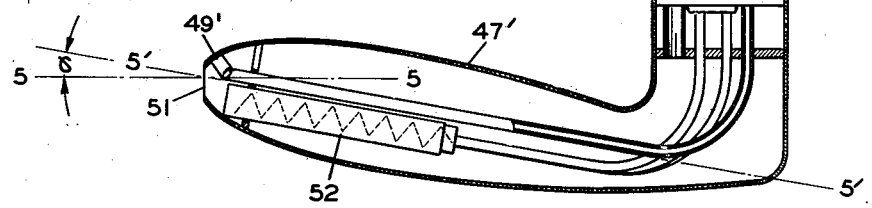
Fig. 9 is a sectional elevation of the device shown in Fig. 7, this section being taken on line 9—9 of section 7.

A different form of pressure head is shown in Figs. 7 to 9 including a shell 47' provided with pressure ports 49' and 50'. The pressure ports communicate with the pressure duct 22. A dynamic pressure port is provided at the front end of the tube at 51 communicating with a pressure duct 19. A heater 52 may be incorporated to maintain the tube structure free from ice under ice forming atmospheric conditions. Electric heater connections are shown at 53.

In the illustrated embodiment the auxiliary airfoil or shell 47 has an axis 5'—5' inclined with respect to the horizontal axis 5—5 by an angle $\gamma$. A permanent angle of pitch $\gamma$ may be provided for in the manufacture of the tube.

Figure 10:
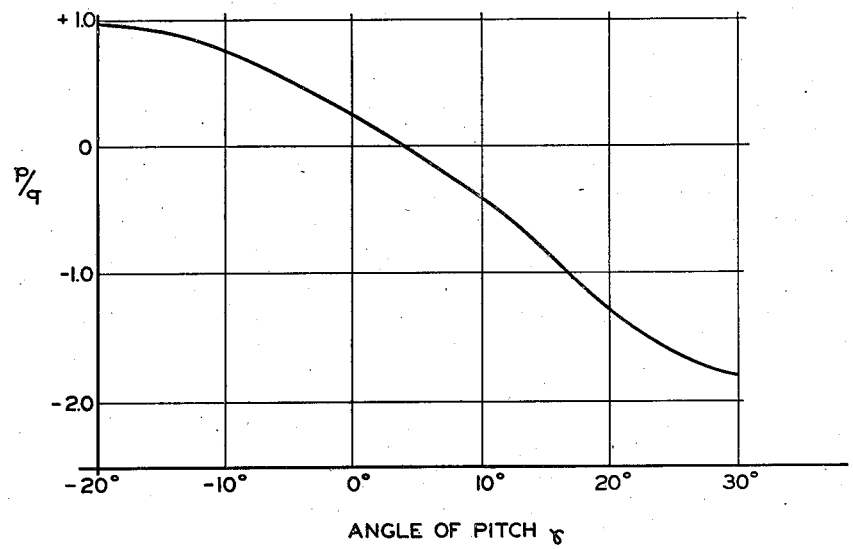
Fig. 10 is a diagram showing a typical curve of angle of attack for various setting angles of the pressure head illustrated in Figs. 4 to 6.

Referring now to Fig. 10, it is seen that the $p/q$ curve has a varying slope depending on the angle of pitch $\gamma$ at which the auxiliary airfoil may be set. Since it is desirable to have a greatest possible change in the indication for smallest changes in the angle of attack, that is the direction in which the surrounding air strikes the airfoil, it is desirable to operate a portion of the curve which is steepest. In the illustrated curve the steepest portion of the curve is at an angle of pitch of approximately 15°. It is, therefore, advantageous to provide for an initial angle of pitch of 15° in installing this pressure head or auxiliary airfoil.

If the airfoil is mounted with its axis 5'—5' horizontal, the response of an indicator operated by the tube to changes in angle of attack may be less, in other words, the amount of travel of the pointer will be reduced for the same change in angle of attack. The most suitable angle of pitch $\gamma$ for each auxiliary airfoil may be determined by testing the airfoil in a wind tunnel.

Obviously the present invention is not restricted to the particular embodiments herein shown and described. Devices of different forms may be used for deriving $p$ and $q$ impulses. Other forms of ratio indicators may be employed. Finally the device may be used in other positions than the ones illustrated in the drawings. Quite obviously the device when turned on its side will respond to the angle of yaw of the aircraft. Likewise the device is useful quite generally for determining the direction of flow of a pressure fluid, pressure fluid being understood as being a gas as well as a liquid.

Moreover, it is not indispensable that all the features of this invention may be used conjointly but the invention can advantageously be employed in various combinations and sub-combinations.

What is claimed is:

1. In an angle of attack indicator for aircraft and the like, air foil means having first and second ports whose axes are disposed at a vertical angle with each other, first and second separate hollow diaphragm capsules surrounded by atmospheric pressure, conduits separately connecting said capsules to said first and second ports, members movable by said diaphragm capsules according to the logarithms of the pressures exerted on the said diaphragm capsules through said conduits and an indicating device including a lever system operative in response to movements of said members to indicated the ratio of the pressures from said ports exerted on said diaphragm capsules.

2. In an angle of attack indicator for aircraft and the like, air foil means having at a leading edge a first port whose axis is substantially parallel to the direction of flight, said air foil means having at its upper surface near its leading edge a second port whose axis is inclined to the axis of said first port, first and second separate hollow diaphragm capsules surrounded by atmospheric pressure, conduits separately connecting said capsules to said first and second ports, members movable by said diaphragm capsules according to the logarithms of the pressures exerted on said diaphragm capsules through said conduits and an indicating device including a lever system operative in response to movements of said members to indicate the ratio of the pressures from said ports exerted from said ports on said diaphragm capsules.

3. In an angle of attack indicator for aircraft and the like, air foil means having first and second ports whose axes are disposed at a vertical angle with each other, first and second separate hollow diaphragm capsules separately connected to said first and second ports, said capsules being surrounded by atmospheric pressure, means comprising adjustable members for causing displacements of said capsules according to the logarithms of the pressures impressed respectively thereon, and an indicating device responsive to the difference in said logarithmic displacements to indicate the angle of attack.

4. In an angle of attack indicator for aircraft and the like, separate first and second air foils for deriving two forces, said first air foil having at its leading edge a force responsive portion whose axis is substantially parallel to the direction of flight, said second air foil having near its leading edge a force responsive portion whose axis is at a vertical angle to direction of flight, and means comprising mechanism for dividing pressures obtained from said first and second portions to obtain the ratio of said forces as an indication of the angle of attack.

5. In an angle of attack indicator for aircraft and the like, air foil means for deriving two forces, said air foil means having at its leading edge a port whose axis is substantially parallel to the direction of flight, said air foil means having on its surface near its leading edge a port whose axis is at a vertical angle to direction of flight, and means comprising mechanism operative in response to pressures at said ports for dividing the pressures obtained from said first and second ports to obtain the ratio between said pressures and to indicate angle of attack according to said ratio.

6. In an angle of attack indicator for aircraft and the like, air foil means having ports with axes disposed at a vertical angle, separate pressure diaphragm devices communicating with said ports, said diaphragm devices being surrounded by atmospheric pressure, a leaf spring driven by each diaphragm, stop devices causing said springs to be displaced according to the logarithm of the pressure applied to its particular diaphragm, a differential lever, connecting means for moving one end of said differential lever in accordance with the displacement of said first spring, connecting means for moving the other end of said differential lever in accordance with the displacement of said second spring, a driven member engaging said differential lever between the ends thereof, and a spring pressed pointer operated by said driven member.

7. In an angle of attack indicator for aircraft and the like, air foil means having first and second ports whose axes are disposed at a vertical angle with each other, measuring devices responsive to air pressures applied at said ports, an indicating device for indicating angle of attack, and means including lever mechanism for combining the movements of said measuring devices to cause said indicating device to operate in response to a ratio of the air pressures applied at said ports, independent of the numerical values of said pressures.

8. In an angle of attack indicator for aircraft and the like, air foil means having an axis substantially parallel to the direction of flight, said air foil means having at a leading edge thereof a first port whose axis is substantially parallel to the direction of flight, said air foil means having at its upper surface near its leading edge a second port whose axis is inclined vertically to the axis of said first port, a first diaphragm responsive to the pressure impressed upon said first port, a second diaphragm responsive to the pressure impressed upon said second port, first and second displaceable elements operated respectively by said diaphragms, an indicating device for indicating angle of attack, and means comprising a lever system for combining the movements of said displaceable elements to operate said indicating device in response to ratio of the pressure obtained from said second port to the pressure obtained from said first port.

9. In an angle of attack indicator for aircraft and the like, an air foil comprising a pressure head including an aerodynamically shaped body having a leading edge and a trailing edge with a longitudinal axis extending therebetween, said axis being disposed approximately in the direction of flight, said body having a substantially elliptical transverse cross section with its longer transverse axis disposed substantially horizontally, said body having on its upper surface near its leading edge a port comprising two horizontally spaced pressure openings symmetrically located with respect to said longitudinal axis, the axes of said pressure openings having a vertical angle of between 25 and 65 degrees with said longitudinal axis, a duct communicating with said ports, means including a second duct terminating in a second port facing the direction of flight and having an axis substantially parallel to the direction of flight, means connected to said ducts to respond to the pressures in said ducts, and indicating means responsive to the ratio of pressure obtained from said first duct to the pressure obtained from said second duct to indicate the angle of attack of the surrounding air on said aircraft.

10. In an angle of attack indicator for aircraft and the like, an aerodynamically shaped body having a leading edge and a trailing edge with a longitudinal axis extending therebetween, said axis being disposed approximately in the direction of flight, said body having a substantially elliptical transverse cross section with its longer transverse axis disposed substantially horizontally, said body having on its upper surface near its leading edge two horizontally spaced pressure openings symmetrically located with respect to said longitudinal axis, the axes of said pressure openings having a vertical angle of between 25 and 65 degrees with said longitudinal axis, said body also having a second pressure port on said leading edge having an axis parallel to said longitudinal axis, a strut connected to the after portion of said body and connected to the aircraft, ducts connecting said ports extending through said body and through said strut to the aircraft, means connected to said ducts to respond to the pressures in said ducts, and indicating means responsive to the ratio of pressure obtained from said first duct to the pressure obtained from said second duct to indicate the angle of attack of the surrounding air on said aircraft.

11. In an angle of attack indicator for aircraft and the like, separate first and second air foils for deriving two forces, said air foils adapted to be mounted adjacent to each other but spaced from the aircraft said first air foil comprising a pressure head including an aerodynamically shaped body having a leading edge and a trailing edge with a longitudinal axis extending therebetween, said axis being disposed approximately in the direction of flight, said body having a substantially elliptical transverse cross section with its longer transverse axis disposed substantially horizontally, said body having on its upper surface near its leading edge a port comprising two horizontally spaced pressure openings symmetrically located with respect to said longitudinal axis, the axes of said pressure openings having a vertical angle of between 25 and 65 degrees with said longitudinal axis, a duct extending through said body and communicating with said ports; said second air foil comprising a body having a longitudinal axis located substantially parallel to the direction of flight, and having a leading edge and a trailing edge, a pressure port on said leading edge having an axis parallel to the longitudinal axis of the body, a second duct extending through said second body and communicating with its port, struts connected to the after portions of said bodies and connected to the aircraft, said ducts extending through said struts to the aircraft, means connected to said ducts to respond to the pressures in said ducts, and indicating means responsive to the ratio of pressure obtained from said first duct to the pressure obtained from said second duct to indicate the angle of the surrounding air on said aircraft.

12. In a device of the character described, a first hollow chamber, a first port at which a pressure $p$ is exerted, a conduit connecting said first port and first hollow chamber, said first chamber having a diaphragm which expands in response to an increase of the $p$ pressure and contracts in response to a decrease of the $p$ pressure, a second hollow chamber, a second port at which a pressure $q$ is exerted, a conduit connecting said second port and said second hollow chamber, said second hollow chamber having a diaphragm which expands in response to an increase of the $q$ pressure and contracts in response to a decrease of the $q$ pressure, and means including a lever system operated by the movements of said diaphragms in response to the $p$ and $q$ pressures to indicate the ratio $p/q$.

13. In a device of the character described, a first hollow chamber connected to a first port, said first chamber having a diaphragm which expands in response to an increase in pressure and contracts in response to a decrease in pressure at said first port, a second hollow chamber connected to a second port, said second chamber having a diaphragm which expands in response to an increase in pressure and contracts in response to a decrease in pressure at said second port, means to restrain the expansion of said diaphragms proportionally to the logarithms of the pressures at said ports, means operative in response to the movements of said diaphragms caused by pressures at said ports to subtract the logarithmic movements of said diaphragms and an indicator operative to indicate the difference in said logarithmic movements.

14. In a device of the character described, a first hollow chamber, a first port at which is exerted a pressure $p$, a conduit connecting said first chamber and first port, said first chamber having a diaphragm which expands in response to an increase of the $p$ pressure and contracts in response to a decrease of the $p$ pressure, a second hollow chamber, a second port at which is exerted a pressure $q$, a conduit connecting said second chamber and second port, said second chamber having a diaphragm which expands in response to an increase of the $q$ pressure and contracts in response to a decrease of the $q$ pressure, an adjustable movable member operative to restrain the movement of said first diaphragm and to be displaced according to the logarithm of the pressure $p$, an adjustable member operative to restrain the movement of said second diaphragm and to be displaced according to the logarithm of the pressure $q$, and means including a lever system operative in response to displacement of said members to indicate the difference of the logarithmic displacements of said members.

CLARENCE L. JOHNSON.